United States Patent Office.

SHERARD OSBORN COWPER-COLES, OF LONDON, ENGLAND, ASSIGNOR OF THREE-FIFTHS TO JAMES NOEL SPARKS AND THOMAS FRAME THOMSON, OF SAME PLACE, AND JOHN STEWART MacARTHUR, OF POLLOKSHIELDS, SCOTLAND.

MANUFACTURE OF ELECTRIC CONDUCTORS.

SPECIFICATION forming part of Letters Patent No. 628,770, dated July 11, 1899.

Application filed December 24, 1897. Serial No. 663,423. (No model.)

*To all whom it may concern:*

Be it known that I, SHERARD OSBORN COWPER-COLES, a subject of the Queen of Great Britain, residing at London, in the county of Middlesex, England, have invented certain new and useful improvements in and connected with the manufacture of electric conductors for use as leading-in wires or strips in the manufacture of incandescent electric lamps, vacuum-tubes, and the like, (for which I have received Letters Patent in England, No. 842, dated January 13, 1896, and in France, No. 260,512, dated October 17, 1896;) and I do hereby declare that the following is a full, clear, and exact description of the invention, which will enable others skilled in the art to which it appertains to make and use the same.

The object of this invention is to produce metallic conductors suitable for use as leading-in wires or strips in the manufacture of incandescent electric lamps, vacuum-tubes, and the like in substitution for the platinum wires hitherto used for the purpose. Attempts have been made to emply iron wire for this purpose, and it has been proposed to coat such wires with another metal, such as tin; but these attempts have hitherto failed. I have discovered that it is necessary to secure successful results to employ pure iron, or iron which is practically pure, and that ordinary commercial iron is not suitable for the purpose. I have also discovered that it is necessary to coat or cover the iron conductors with an alloy not readily oxidizable and of a low melting-point, such that it will become fused when the heat necessary for effecting the sealing in of the conductors is applied. After receiving such coating or covering and prior to the sealing-in process the conductors may receive a coating of vitreous material. According to my invention I employ, preferably, chemically-pure iron produced by electrolysis, which may be done by employing scrap-iron as an anode, with a cathode of steel or other metal, from which deposited iron may be readily removed, and any suitable electrolyte, such as a solution of iron sulfate or sulfuric acid or the like. The electrolytically-deposited iron is stripped from the cathode and formed into the necessary shape to constitute the required wires or strips by annealing and drawing. All traces of oxidation or impurity should then be removed therefrom and the wires or strips thus prepared be passed through a bath containing the molten alloy. Good results can be obtained with an alloy composed of fifty parts (by weight) of tin, twenty-five parts of lead, twenty-five parts of cadmium, and one part of aluminium; but I do not limit myself to this particular alloy. To insure a perfect coating, I find it advantageous to cover the surface of the bath of molten alloy with zinc chlorid or other suitable flux.

In applying the wires or strips to the lamps, tubes, or the like a thin coating of glass may be applied (by spinning or wrapping, for example, or immersion in a bath of molten glass) to the parts of the wires or strips which are to be sealed into the bulb, tube, or the like. The sealing in of the wires or strips is then effected by the application of heat in the ordinary way, when, owing to the iron employed being in a pure or practically pure state and the alloy covering it being of the requisite low melting-point, the wires or strips become hermetically attached to the glass of the bulb, tube, or the like through which they pass.

It is found that pure iron will expand almost in the same ratio as glass, and consequently there is no breakage of the glass in cooling, whereas ordinary iron has a coefficient of expansion considerably different from that of glass, and breakage of the glass occurs where attempts are made to unite such iron and glass. The glass appears to flux or combine with the coating metal of low fusing-point, and thus form a perfect seal with the pure iron wire.

Having fully described my invention, what I claim, and desire to secure by Letters Patent, is—

1. An electric conductor composed of practically pure iron and provided with a metallic coating having a low melting-point.

2. An electric conductor composed of practically pure iron and provided with a metallic coating having a low fusing-point, and a supplemental vitreous coating.

3. An electric conductor composed of practically pure iron and provided with a non-oxidizable alloy of a low melting-point.

4. The method of producing electric conductors or leading-in wires, which consists in subjecting iron to an electrodepositing operation, removing all traces of oxidation or impurities therefrom, and forming said iron in strips, and then passing said strips through a bath of molten alloy.

5. The method of producing electric conductors or leading-in wires, which consists in first subjecting commercial iron to an electrodepositing operation, then removing all traces of oxidation or impurities therefrom, forming said iron in strips, and then passing said strips through a bath of molten alloy, the surface of which is covered with a suitable flux.

SHERARD OSBORN COWPER-COLES.

Witnesses:
   CHAS. A. ALLISON,
   HARRY A. McLELLAN.